United States Patent Office 3,378,682
Patented Apr. 16, 1968

3,378,682
RAILROAD SWITCH LOCK RELEASE CIRCUITS
Charles W. Failor, Forest Hills, Pa., assignor to Westinghouse Air Brake Company, Swissvale, Pa., a corporation of Pennsylvania
Filed Aug. 9, 1966, Ser. No. 571,209
12 Claims. (Cl. 246—219)

My invention pertains to railroad switch lock release circuits. More specifically, this invention pertains to improved arrangements for using overlay track circuits to control the release of electric switch locks in a manner that there will be no interruption to the indications of cab or speed control signals carried on through trains passing the switch lock locations.

In order to provide for complete protection to train movements along the signaled main line of a railroad, it is customary to provide switch locks for any main line track switch which is not power controlled as part of an interlocking or as part of a CTC system. In other words, hand-throw track switches leading or providing access to industrial sidings or storage tracks are normally provided with an electric or mechanical lock which prevents their operation until the lock is released either by remote control from the dispatcher, by a controlled timing period, or by some local track circuit arrangement which provides complete protection to all trains. It is well-known to use overlay track circuits, particularly in the audio frequency range, to obtain immediate release of such switch locks in order that a train occupying the main line may enter an industrial or storage siding. In such situations, the train is positioned to occupy the overlay track circuit zone. The detection of this track circuit occupancy actuates the switch lock release and thus eliminates any timing period that may be otherwise associated with the switch lock release, for example, as when a train desires to enter the main line from the siding. The use of overlay track circuits eliminates the need for additional insulated joints which are required if short, direct current track circuits are used for this purpose.

It has been found, however, that the straight forward use of overlay track circuits, in territory where cab signals are also in service, frequently results in the interruption of cab signal indications on trains which are passing the location and not entering the siding. This occurs since the basic overlay track circuit detects the presence of all trains within its effective area or zone of operation whether or not these trains intend to enter the controlled siding. Of course, the overall signal system must check the proper condition of the track switch, its lock apparatus, associated circuits and relays in order to provide complete safety. However, the overlay track circuit occupancy check is not vital to this overall signal system check since the conventional track circuit which also exists throughout the stretch has already detected the presence of the train and continues to do so since there are no insulated joints setting off the overlay track circuit which disrupt the continuity of the regular track circuit system. Thus it is satisfactory if the overlay track circuit is modified in a manner that it will not specifically detect train occupancy unless preliminary preparations have been made or completed to obtain the switch lock release. Such modified circuits must, however, detect and provide a check of any abnormal condition of the switch lock apparatus. This includes checks of the position of the switch itself, the secured condition of the door of the switch lock case or the padlock securing the switch, the position of the switch lock levers, and similar conditions of associated apparatus.

Accordingly, an object of my invention is an improved control arrangement for electric switch locks, in cab signal territory of a railroad, using overlay track circuits.

It is also an object of my invention to provide an improved switch lock release arrangement using overlay track circuits in a manner which does not interrupt the supply of cab signal energy to the rails for controlling cab signal indications on trains which do not use the locked switch.

Another object of my invention is an overlay track circuit arrangement, for controlling switch locks which does not specifically indicate the presence or absence of a train at the switch location unless the associated switch lock has been prepared for release.

A further object of my invention is an overlay track circuit for railroad switch lock release purposes which is normally completed through a tuned series circuit connection to the rails of the track in order to maintain the overlay circuit in a non-detecting state when the switch lock apparatus is not prepared for release.

It is an object of my invention to provide an overlay track circuit, for use in a switch lock control arrangement, which maintains its track relay normally energized to indicate the continued operable condition of the overlay apparatus to actuate a release of the switch lock.

Still another object of my invention is an improved circuit arrangement for the control of the release of an electric switch lock in cab signal territory of a railroad, utilizing overlay track circuits normally series connected with the rails to eliminate any disruption of the cab signal indications on through trains.

Yet another object of my invention is an overlay track circuit arrangement for controlling the release of electric switch locks which track circuit is activated to control the release of the switch lock only when preliminary preparations to obtain the release of the switch lock apparatus have been completed.

Other objects, features, and advantages of my invention will become apparent from the following description when taken in connection with the accompanying drawings.

In practicing my invention, I use an overlay track circuit, which may be of, but is not limited to the audio frequency (AFO) type, connected without additional insulated joints to the rails in the vicinity of a track switch which is equipped with switch lock apparatus. This overlay circuit may use a transceiver, that is, a combined transmitter-receiver unit, or may utilize a separate transmitter and receiver. Ordinarily this circuit is responsive to a train occupying a zone along the track on the order of 50 to 100 feet in length. In the arrangement of my invention, auxiliary connections to the rails are used to connect the overlay track circuit in a series connection with the rails of the track. These auxiliary connections include a tuned element, for example, a capacitor of selected size, to block the direct current of the conventional track circuits and/or the alternating current of conventional cab signaling frequencies. Thus the regular signaling system for the stretch of track which includes this switch is not effected by the overlay track circuit and its auxiliary connections. In each illustrated embodiment of my invention, the auxiliary connections are controlled by relay contacts which respond to preliminary preparations of the switch lock apparatus to obtain a release. In general, these preliminary preparations comprise the unlocking and opening of the door of the case in which the control lever for one type of switch lock is located or, in another type of lock, comprise removing a padlock from its keeper in the lock equipment. It is to be noted that, in each type of switch lock, the key for the physical lock of the case door or the padlock is peculiar to train crews and thus not readily available to unauthorized persons. Therefore, the utilization of these preliminary preparations to activate the overlay track circuit retains an inherent degree of control of safety by authorized railroad personnel. When these preliminary preparations are completed, the overlay track circuit is then responsive solely to a train occupying its effective zone of action, that is, the length of the track over which the overlay circuit is effective to detect occupancy by a train. If a train is occupying this particular zone of the main line, its detection actuates the completion of the switch lock release operation and the full release of the switch is obtained. The track switch may then be positioned for the train to enter the siding. In each illustrated embodiment of my invention, and in appropriate modifications thereof, the entry of a train from the siding onto the main line is not controlled by the overlay circuit but by conventional circuits in accordance with the type of signal system in general use throughout the stretch of track. For example, in the second embodiment illustrated, the signal system utilizes coded track circuits of the direct current type with a pair of insulated joints provided at the switch lock location to establish a cut section to control the movements of trains from the siding to the main track.

I shall now describe in detail two specific arrangements embodying my invention and then point out the novel features thereof in the appended claims. Reference is made from time to time in the following description to the accompanying drawings in which:

Figure 1:
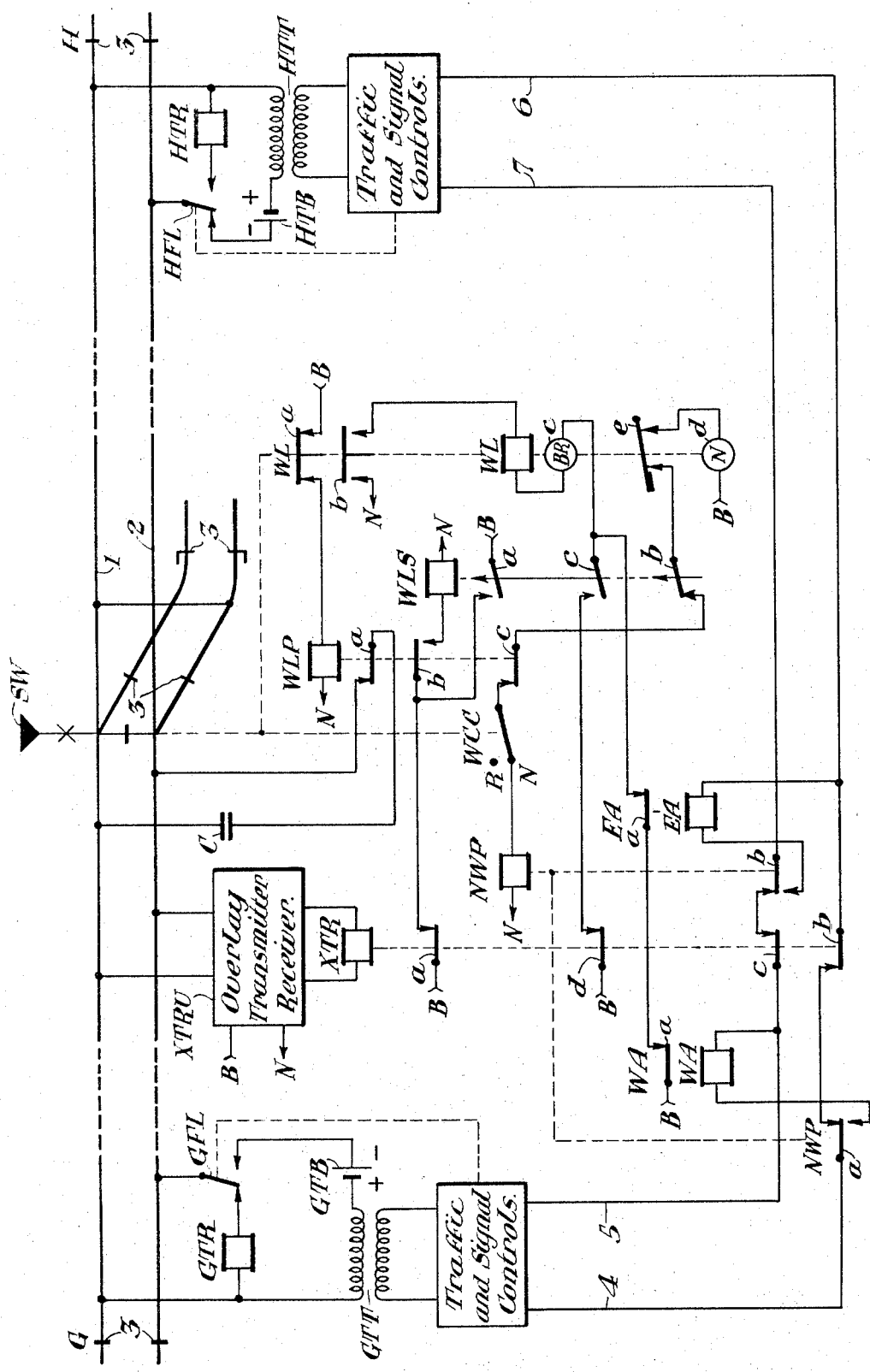
FIG. 1 is a diagrammatic circuit arrangement utilizing an overlay track circuit for controlling the release of switch lock apparatus, the arrangement embodying one specific form of my invention.

In each of the figures of the drawings, similar reference characters refer to similar parts of the apparatus. Also in each of the drawings, a source of direct current energy is assumed. However, since several types of such sources are in conventional use, only the positive and negative terminals, thereof, are illustrated, and designated by the reference characters B and N, respectively. Any illustrated connection to such terminals designates a connection to the corresponding terminal of the direct current source. In a like manner, a source of alternating current energy of a frequency suitable for conventional cab signal systems is assumed but the actual source is not shown since the use of such is conventional. Only the terminals of the alternating current source, designated by the referencs BX and NX, are illustrated in the drawings.

Referring now to FIG. 1, a stretch of single track railroad is shown extending between the location G at the left and the location H at the right of the drawing. This stretch of track includes the rails 1 and 2 which are continuous between the locations but at each location are set off, that is, insulated, from the adjoining track stretches by the insulated joints 3 shown in a conventional manner. Although the rails 1 and 2 are continuous between locations G and H, certain portions of the symbol for each rail is shown dotted in order to indicate additional distance between the left and right locations which is not physically represented in the drawing. The stretch of track G–H is provided with a conventional signal system which is shown as being of a reversible type in order to accommodate train movements in each direction over the single track. The system is conventionally shown to include a direct current track circuit and a two-wire signal line circuit, each of which is also of the reversible type, well-known in the art. For example, the system may be similar to that shown in Letters Patent of the United States No. 2,420,579 issued to Henry S. Young on May 13, 1947, for Railway Traffic Controlling Apparatus, except that here alternating current energy is also supplied to the rails to control cab signal apparatus carried on trains moving over this stretch of track.

Although reference is made to the Young patent for a full understanding of such systems, a brief description of the apparatus shown conventionally is included herein for a complete understanding of my invention. At each end of the single track stretch, the apparatus includes a track relay, a traffic control lever, a track battery, a track transformer for the cab signal energy, and certain traffic and signal control apparatus. For example, at location G, a direct current track relay GTR is connected across the rails of the stretch over a contact of a traffic lever GFL positioned in its left hand position. If traffic lever GFL is in its right hand position, the track battery GTB and the secondary of a track transformer GTT are connected in series across the rails of the section G–H. The application of cab signal energy to the primary of transformer GTT is controlled by the various traffic and signal control apparatus at this location which is indicated by a conventional block so designated and whose details may be understood by a study of the Young patent. The control exercised by traffic lever GFL over the traffic and signal control apparatus is indicated by a conventional dotted line. The two-wire line circuit extending between locations G and H, designated at location G by wires 4 and 5, is also controlled by this same conventional traffic and signal control apparatus. As specifically shown in FIG. 1, the signal system is conditioned to establish eastbound traffic, that is, from left to right. Under these conditions, track relay GTR is connected to the rails at location G while at location H, traffic lever HFL is positioned to the left to connect track battery HTB and the secondary of track transformer HTT across the rails. Energy is also supplied under this condition from location H to the two-wire line circuit, designated at the right by wires 6 and 7, in order to control the indication displayed by a wayside signal at location G. It is understood that the application of cab signal energy to the rails may be approach-controlled so that energy is actually applied only when a train enters the track stretch shown.

The stretch of track G–H includes a track switch SW which leads to an industrial or storage siding. Switch SW is a hand throw switch and is equipped with an electric switch lock, as designated by the standard AAR Signaling and Communication Section symbol shown in the drawing. Also as shown by conventional symbols, the switch rod is insulated in order to prevent shunting the regular track circuit and insulated joints and a bond wire track connection are used in a conventional manner to protect main line train movements against cars occupying the fouling portion of the siding track. Switch SW controls a switch controller contact WCC, the control being indicated by a conventional dotted line and the contact occupying its N and R positions as the switch is in its normal and reverse positions, respectively.

As indicated previously, switch SW also has associated therewith electric switch lock apparatus which is shown using standard symbols in the vertical column designated by the reference character WL. This apparatus is operationally connected to the switch as indicated by the conventional dotted line. For purposes of a specific illustration, it is here assumed that the switch lock WL is of the type provided with a small case in which is located the lock control lever. Contact sets $a$ and $b$ of switch lock WL are then the contacts controlled by the door of this case, contacts $a$ being closed, that is, the circuit completed therethrough, when the door is closed, and contacts $b$ being closed when the door is open. The magnet winding of the switch lock is designated by a conventional relay symbol designated by a second reference WL. The contacts operated by the switch lock control lever (not shown) are illustrated as small circles designated as WL contacts $c$ and $d$. Lever contact $c$ is closed when the lever is positioned anywhere between its indicating position B and its reverse position R, that is, occupies any position other than its normal position.

Lever contact d is closed to complete the circuit therethrough only when the lever is in its normal position N. Contacts e of switch lock WL are those controlled by the magnet winding armature. When the magnet winding is deenergized, the armature is released and the circuit between contacts e is closed. However, this circuit is interrupted when the magnet is energized and picks up its armature to unlock the switch lock lever by removal of the locking dog symbolized at the free end of the armature. The lever can then be moved to release the actual hand throw switch movement for operation to its reverse position.

The overlay track circuit apparatus is here shown specifically as being a single transmitter-receiver unit XTRU. Such units are known in the art and are also designated as transceivers. While the selected frequency for unit XTRU may be within the audio range, i.e. an AFO transceiver, my arrangement is not limited to such frequency range and the broader term overlay track circuit is used. Unit XTRU has associated therewith a track relay XTR. This relay is energized so that it picks up when the output circuit across the track terminals of unit XTRU through the rails is complete, that is, a completed circuit path exists from one track terminal to the other. Unit XTRU is provided with operating energy from terminals B and N of the direct current source.

Quite frequently, it is desirable that the dispatcher in charge of train movements through a particular stretch of track, for example, stretch G–H of FIG. 1, be kept informed regarding the operable condition of switch lock release arrangements so that he will know in advance that a circuit fault may prevent the release of a switch lock if a train is directed to use the corresponding switch. When a single transmitter-receiver unit is used in the overlay track circuit, as in FIG. 1, the most likely fault condition is that the XTRU unit itself fails. Since, as will become evident, the overlay track relay must pick up to release the switch lock, failure of a unit XTRU prevents a train crew from obtaining the lock release to operate the switch. It is obvious that a solution is to retain the overlay track circuit normally energized so that release of the overlay track relay may provide an indication to the dispatcher that a circuit fault exists in the switch lock control arrangement which will effect the movement of trains. With such advance warning, maintenance personnel may be directed to make repairs.

In order to assure that relay XTR is normally in its energized condition, auxiliary circuit connections are provided by the system of my invention. These auxiliary connections comprise the circuit from rail 1 through capacitor C and front contact a of switch lock repeater relay WLP to rail 2. Relay WLP is energized by a simple circuit extending from terminal B through contacts a of switch lock WL and the relay winding to terminal N. It is obvious that relay WLP is normally energized and picked up and becomes deenergized and releases its contacts when the door of the switch lock case is opened. The value of capacitor C is selected to pass current of the frequency selected for unit XTRU but to substantially block the passage of direct current and current of conventional cab signal frequencies, for example, 60 or 100 cycles per second. The auxiliary circuit connection comprising capacitor C and front contact a of relay WLP thus provides, together with portions of rails 1 and 2, a normally completed circuit path across the track terminals of unit XTRU. As long as this condition exists, relay XTR is energized regardless of the occupancy condition of the effective track zone of the overlay track circuit.

The other apparatus provided by the system of my invention includes a switch lock stick relay WLS. This relay is energized by a circuit including front contact a of relay XTR and back contact b of relay WLP so that it becomes energized immediately upon the release of relay WLP due to the opening of the switch lock case door. However, relay WLS is provided with slow pick up characteristics, as designated by the upper pointing arrows drawn through the movable portion of its contacts. Therefore, a preselected period of energization of its winding is required before the front contacts of relay WLS are closed. Relay WLS is provided with a stick circuit including its own front contact a and back contact b of relay WLP. The normal switch repeater relay NWP is normally energized by the circuit extending from terminal B over lever contact d and armature contacts e of switch lock WL, back contact b of relay WLS, front contact c of relay WLP, switch controller contact WCC in its normal position, and the winding of relay NWP to terminal N.

The remaining relays, west and east approach relays WA and EA, respectively, are controlled by the signal line circuit under special conditions. For example, relay WA is energized by energy received from the traffic and signal control apparatus at location G over line wires 4 and 5 when the winding of relay WA is connected across these line wires by the release of relay NWP to close its back contact a. It is to be noted that line wire 4 is normally connected to line wire 6 over front contact a of relay NWP and front contact b of relay XTR. In a similar fashion, relay EA is energized by energy received over line wires 6 and 7 from the traffic and signal control apparatus at location H when the winding of relay EA is connected across these line wires over back contact b of relay NWP. Line wire 7 is normally connected to line wire 5 over front contact b of relay NWP and front contact c of relay XTR. The front contacts of relay XTR inserted in this signal line circuit can be used, through the traffic and signal control apparatus at either end, to provide an advance warning to the dispatcher that a fault condition exists in the overlay circuit including unit XTRU.

One final circuit remains to be traced, that for the magnet winding of switch lock WL. This winding must be energized in order to release the switch lock lever and thus allow it to be moved to unlock the hand throw movement of switch SW so that it can be moved to its reverse position for a train movement to the siding. The principal circuit for magnet winding WL involved in the system of my invention is that extending from terminal B over front contact d of relay XTR, front contact c of relay WLS, lever contact c of switch lock WL, magnet winding WL, and door contacts b of lock WL to terminal N. When this circuit is complete, magnet WL picks up its armature, as illustrated at e, to release the lever lock. Under the conditions of a train desiring to leave the siding and enter the main line, another circuit for magnet winding WL includes front contacts a of relays WA and EA and contacts b and c and the magnet winding of switch lock WL.

I shall now describe the operation of the arrangement of FIG. 1 under various conditions of train movements. It is assumed initially that the apparatus is in the condition shown in the drawing. In other words, switch lock WL is in its normal fully locked condition with the case door closed and the lever in its normal position so that contacts a, d and e of the switch lock are closed. Relay WLP is energized and its front contact a completes the auxiliary connections across the rails including capacitor C. The overlay transmitter-receiver unit XTRU thus has its track output circuit completed through the auxiliary circuit so that associated track relay XTR is energized. As before, it is assumed that established traffic through the stretch of track from G to H is in the eastbound direction so that direct current track energy and alternating current cab signal energy are being applied to the rails at the east end of the stretch at location H. The signal line circuit including wires 4–6 and 5–7 is completed between the locations so that the signal control apparatus at location G receives energy and together with track relay GTR controls wayside signals to permit a train movement.

As a through train not intending to stop at switch SW passes through the section, it shunts rails 1 and 2 in the usual manner to cause the regular signal system to display a stop signal behind the train. However, with relay XTR energized, the circuit connections completing the signal circuit remain in order so that there is no interruption of the supply of cab signal energy to the rails at location H. As this train passes the location of switch SW and particularly through the zone of response of the overlay track circuit, the shunt provided by the wheels and axles of the train supplements the auxiliary connection through capacitor C and front contact $a$ of relay WLP to maintain track relay XTR in its energized condition. However, since there is no change in the existing conditions, and since the switch lock apparatus is not prepared for release, that is, the door remains closed, the continued energization of relay XTR has no effect upon the operation of the regular signal system. The train continues its movement in the eastward direction and eventually passes out of the stretch of track shown without any further operation of the signal system occurring while it is in this stretch. Cab signal energy continues to be supplied to the rails from location H and the cab signal apparatus of this through train receives this energy in the usual manner and continues this display the corresponding cab signaling indication.

Now assume that another train moving in the same direction desires to stop and enter the siding controlled by switch SW. Initially, as this train enters stretch G–H, the operation of the regular signal system is as previously described. However, as this train reaches the location of switch SW, it is stopped just prior to reaching the switch points. A member of the train crew then unlocks and opens the door of the case of switch lock WL. This causes contacts $a$ of lock WL to open and contacts $b$ to close. Relay WLP is thus deenergized and releases, opening its front contact $a$ to interrupt the auxiliary connections across the rails which include capacitor C. However, with the train standing in this portion of the track stretch, at least some of its wheels and axles maintain a shunt between rails 1 and 2 within the overlay circuit zone. Thus the track output circuit of transmitter-receiver unit XTRU remains complete and relay XTR remains energized. With the release of relay WLP to close its back contact $b$, and with front contact $a$ of relay XTR remaining closed, the circuit is completed for energizing relay WLS which picks up at the termination of its slow pick up time. It is to be noted that if the door of the switch lock case is opened with no train occupying this zone of the track stretch, the interruption of the auxiliary connections across the rails deenergizes relay XTR which releases to open its front contact $a$ and deenergize relay WLS. This occurs prior to the expiration of the time period for the pick up of relay WLS to complete its stick circuit and this latter relay thus remains released. However, under the assumed conditions with the train waiting to enter the siding, relay WLS picks up and completes the stick circuit over its own front contact $a$ and back contact $b$ of relay WLP.

The magnet winding of switch lock WL is now energized, its circuit being completed over front contact $d$ of relay XTR which remains closed, front contact $c$ of relay WLS, now closed, WL lever contact $c$, closed by operation of the lever to position B, and door contacts $b$ of lock WL, which are closed with the case door open. When magnet winding WL is energized, it picks up its armature, opening contacts $e$ and releasing the lock lever to allow it to be moved to its full reverse position R. This unlocks the hand throw switch movement and the switch can be operated to its reverse position. It is to be noted that, after the train crewman opens the case door, he moves the lever handle from its normal position to the indicating position B, closing WL contact $c$ to further prepare the circuit for magnet winding WL. However, the lever cannot be moved to its full reverse position until magnet winding WL is energized and picks up its armature to release the lever. With the switch unlocked and positioned in its reverse position, the train may enter the siding or may make such movements as may be desired into the siding and back out as long as a portion of a train is left on the main line. It is to be noted at this point that relay NWP is initially deenergized upon the opening of front contact $c$ of relay WLP. The circuit for relay NWP is further interrupted during the release sequence by the opening of back contact $b$ of relay WLS, lever contact $d$ and armature contacts $e$ of lock WL. When switch SW is moved to its reverse position so that contactor WCC occupies its R position, every possible point in the circuit for relay NWP is interrupted. This circuit thus checks every possible abnormal condition of the switch lock and the switch.

It is to be particularly noted that any operation of the switch lock apparatus or the switch without the presence of a train in the effective zone of detection of the transmitter-receiver unit XTRU will result in the release of relays XTR and NWP to interrupt the signal line circuit and thus cause a display of stop signals against any train wishing to enter this stretch of track between G and H. Any abnormal condition of the switch or of the switch lock is thus detected. When a train in the siding wishes to enter the main line and has received permission from the dispatcher to do so, a crewman opens the door of the switch lock case. This causes the release of relay WLP, opening its front contact $c$ which in turn causes the release of relay NWP. The closing of back contacts $a$ and $b$ of relay NWP connects relays WA and EA across the west and east portions, respectively, of the signal line circuit. The operation of the regular signal system is such that, under these conditions, energy is applied to line wires 4 and 5 at location G and also to line wires 6 and 7 at location H. This energy is applied, respectively, to the windings of relays WA and EA causing each relay to pick up. The second circuit for magnet winding WL is then completed by the closing of front contacts $a$ of relays WA and EA, the remainder of the circuit being prepared when the crewman opens the case door and moves the lever to its indicating position B. This train on the siding may then enter the main line, over track switch SW in its reverse position, fully protected against any other train movement in either direction into this stretch of track. Also, this train may move in either direction, that is, to either location G or H, in accordance with the indication displayed by its cab signal apparatus.

Figure 2:
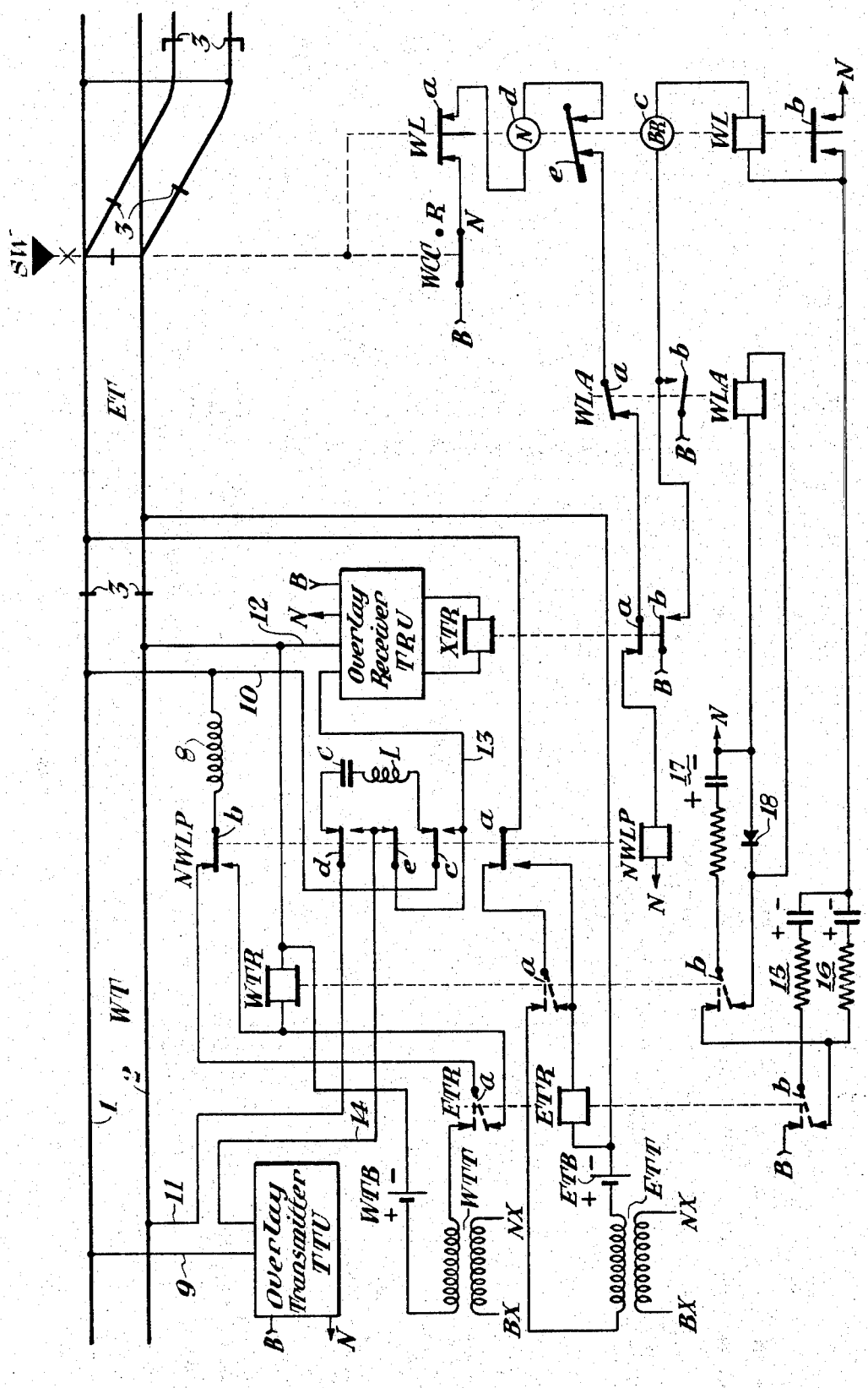
FIG. 2 is a similar circuit arrangement embodying a second specific form of my invention utilizing an overlay track circuit to control the release of switch lock apparatus.

Referring now to FIG. 2 of the drawings, I shall describe the arrangement embodying a second form of my invention. This arrangement differs from that of FIG. 1 in the type of overlay track circuit apparatus used and in the basic signal system provided for the stretch of track. It is to be noted that separate units are used for the overlay track circuit, transmitter unit TTU and receiver unit TRU. Receiver unit TRU controls the associated track relay XTR, which is energized and thus picked up when unit TRU receives energy from transmitter unit TTU. Again, it is intended that the selected frequency of the overlay track circuit need not be restricted to the well-known audio frequency range but may be selected at a higher level if desired.

The portion of a stretch of track comprising rails 1 and 2 which is shown includes a track switch SW which is provided with switch lock apparatus in the usual manner. A single pair of insulated joints 3 is shown a short distance from the actual track switch location. These joints divide the stretch of track into a west section WT and an east section ET. It is to be noted that, for simplicity, the rail connections of the overlay track circuit are entirely within west track section WT although this is not a necessity. The insulated joints in rails 1 and 2 and the associated regular signal apparatus form a cut section in a coded track circuit signal system such as, for example, shown in Letters Patent of the United States No. 2,292,967 issued to J. M. Pelikan on Aug. 11, 1942, for Railway Traffic Controlling Apparatus. The arrangement shown is particularly similar to the cut section between track sections 4T and 7T shown at location F in the Pelikan patent. However, in the present showing, cab signal energy is also supplied to the rails of each section in a manner similar to that shown in my Letters Patent of the United States No. 2,281,929 issued May 5, 1942 for Railway Signaling Apparatus. In this present showing, only a single end of each track circuit is illustrated, that is, the end at the cut section location in FIG. 2. However, each track circuit is of the reversible type with the end shown transmitting or receiving track circuit energy in accordance with the established direction of traffic throughout the stretch.

Although a full understanding of the operation of the coded track circuits may be had from the Pelikan patent, I shall describe briefly the operation of the track circuit apparatus for the regular signal system as shown at the cut section of FIG. 2 in order to herein complete the understanding of my invention. When traffic is established in an eastbound direction, that is, from left to right over the stretch of track, the apparatus for track section ET shown in the drawing is receiving energy from the other end of the track circuit. The connections for controlling track relay ETR, with the switch lock in its normal condition, may be traced from rail 1 over front contact a of normal switch and lock repeater relay NWLP and back contact a of west track relay WTR to the winding of relay ETR and thence to rail 2 of the section ET. When the established traffic direction is westbound, energy is supplied from this location to track section ET by a circuit traced from the positive terminal of track battery ETB through the secondary winding of track transformer ETT, front contact a of relay WTR, and front contact a of relay NWLP to rail 1 of section ET, returning from rail 2 to the negative terminal of battery ETB. It is to be noted that the movable portion of each contact of relays ETR and WTR is shown dotted in both the upper and lower positions, that is, both picked up and released. Since these relays may at times be operating to follow coded energy received from the rails, the dotted indications are used to designate such code following operation. At other times, of course, these relays may occupy for a period a single position, normally the released position in which back contacts are closed. It is also to be noted that, if relay NWLP is released in a manner to be discussed later, the connections for relay ETR to the rails of section ET are direct over back contact a of relay NWLP and the contacts of relay WTR are disconnected from the circuit.

Similar track circuit connections exist for the apparatus associated with track section WT. With eastbound traffic established, so that energy is being supplied to section WT at this cut section location, the circuit may be traced from the positive terminal of track battery WTB through the secondary winding of track transformer WTT, front contact a of relay ETR, front contact b of relay NWLP, and a reactor winding 8 to rail 1 of section WT, returning from rail 2 to the negative terminal of battery WTB. For both the east and west track sections, the corresponding track transformer is used to supply rail energy for operation of the cab signal apparatus carried by trains moving through the section. The primary of each transformer is supplied with such energy from terminals BX and NX of an appropriate alternating current source. Reactor winding 8 is included in the track circuit connections for section WT to block current of the overlay track circuit frequency from the local connections for the regular signal system track circuits. When westbound traffic is established so that energy is being received from the other end of section WT, the connections may be traced from rail 1 of section WT through reactor 8, front contact b of NWLP, back contact a of relay ETR, and the winding of relay WTR to rail 2 of the track section. Again, if relay NWLP is released so that its back contact b is closed, contact a of relay ETR is disconnected from the circuit and only the winding of relay WTR and reactor 8 are included in the track circuit connections. Thus for each track section, the release of relay NWLP assures the removal of cab signal energy from the rails regardless of the established traffic direction. For later understanding, it may be noted here that, without the invention provided by my invention, the release of relay XTR, and the associated release of relay NWLP, when an eastbound through train occupies the effective zone of response of the overlay track circuit, will remove the cab signal energy from section WT and cause the display of a restricted cab signal aspect until the train passes into section ET. This signal flash occurrence is at least disconcerting to the engineer and may cause the train to be braked to an unnecessary stop.

Considering now the overlay track circuit arrangement, my invention again provides auxiliary connections so that, with track switch SW and its associated switch lock in their normal positions, the overlay apparatus is connected in a series circuit with the rails of track section WT. Under normal conditions of the switch and its switch lock, relay NWLP, as will be shortly described, is in its picked up condition closing its front contacts. Thus normal connections for the overlay circuit may be traced from the left track output terminal of unit TTU over wire 9 to rail 1, thence over wire 10 and front contact c of relay NWLP through reactor winding L and capacitor C, continuing over front contact d of relay NWLP, wire 11, rail 2, and wire 12 to one track input terminal of receiver unit TRU. The return circuit extends from the other track input terminal of receiver TRU over wire 13, front contact e of relay NWLP, and wire 14 to the right track output terminal of transmitter TTU. The values of reactor L and capacitor C are selected so that the series connection provides a circuit tuned at the frequency selected for the overlay track circuit. In other words, the tuned circuit element is capable of passing current of that frequency and substantially blocking current of other frequencies used in the rails and also direct current. When relay NWLP is in its released position so that its back contacts are closed, transmitter unit TTU is connected directly across rails 1 and 2 over wire 9 and a combination of wires 11 and 14 and back contact d of relay NWLP. Under these conditions, receiver unit TRU is connected directly across rails 2, and 1 over wire 12 and the combination of wires 10 and 13 with back contact c of relay NWLP. The series connection through capacitor C and reactor L is disconnected from the overlay circuit under this situation and a parallel connection of the units across the rails results.

Within section ET is a track switch SW, designated as being a hand throw switch equipped with an electric switch lock, which controls moves from the main track to an industrial siding. It is to be noted that insulated joints and a conventional track bond connection are used to detect cars occupying the fouling portion of the siding to protect main line movements. Also the rods of the switch movement are insulated to prevent shunting the normal track circuits. Switch SW controls the switch controller contact WCC in the usual manner, this contact occupying its N and R positions as the switch is positioned in its normal or reverse position, respectively. As indicated, switch SW is equipped with an electric switch lock WL shown in a manner similar to that for the electric switch lock of FIG. 1. Reviewing briefly the description previously provided, switch lock WL is provided with door contacts a and b which are closed as the door of the switch lock case is, respectively, closed and open. Lever contacts c and d are again provided, contact c closing the circuit therethrough when the lever is in any position from B to R and lever contact d closing the circuit only when the lever is in its normal position N. Armature contacts e are closed when the magnet winding WL is deenergized. When the armature is picked up, the circuit is interrupted and also the switch is released from its locked condition.

The normal switch and lock repeater relay NWLP is normally energized by a circuit which may be traced from terminal B over contact WCC in its normal position, door contacts *a*, lever contact *d*, and armature contacts *e*, all of switch lock WL, back contact *a* of switch lock approach relay WLA, front contact *a* of relay XTR, and the winding of relay NWLP to terminal N. From this circuit, it is obvious that relay NWLP will be deenergized and release when any item associated with the switch or the switch lock occupies an abnormal position or condition. Relay NWLP will also be deenergized if the overlay track circuit apparatus is not functioning in a normal manner or if the track circuit controlled thereby is disrupted, any of these conditions being indicated by the release of relay XTR.

Magnet winding WL of the switch lock is controlled by a first circuit including back contact *b* of relay XTR, lever contact *c*, the magnet winding, and door contacts *b* of switch lock WL. It is obvious that this circuit is completed when the overlay track circuit detects the presence of a train within its effective zone and the preliminary preparations have been completed for the release of the switch lock as indicated by the opening of the door of the case and the movement of the lever to its indicating position B. A second circuit for energizing the magnet winding includes front contact *b* of relay WLA in place of back contact *b* of relay XTR, the remainder of the circuit being as previously traced.

Switch lock approach relay WLA provides a check that no train is closely approaching the switch lock location when it is desired to provide a switch lock release in order that a train in the siding may enter the main line. In describing operation of this relay, it is first necessary to assume that the train occupying the siding has received permission to enter the main line and that a crewman has opened the door of the switch lock case. The opening of door contacts *a* of switch lock WL interrupts the circuit for relay NWLP causing it to release. The closing of back contacts *a* and *b* of relay NWLP directly connects ETR and WTR across the rails of sections ET and WT, respectively, so that they are responsive only to energy received from the far end of the corresponding track section. Since the opening of the corresponding front contacts *a* and *b* of relay NWLP interrupts retransmission of energy from one end of the track stretch to the other, the apparatus at the far end of sections WT and ET will automatically or by remote control be conditioned to supply energy towards the cut section location shown in FIG. 2.

The reception of this coded energy over the rails of sections ET and WT will cause corresponding code following operation of relays ETR and WTR. With door contacts *b* of switch lock WL closed with the case door open, the periodic closing of front contact *b* of relay ETR supplies pulses of direct current energy to the resistor-capacitor unit 15, causing the capacitor to assume a charge of a polarity indicated by the markings in the drawing. During the off periods of the coded energy received by relay ETR, the closing of its back contact *b* completes a circuit loop to transfer the energy from capacitor 15 to the resistor-capacitor unit 16, the polarity again being that designated by the markings in the drawing. Since relay WTR is also following coded energy transmitted from the far end of section WT, the periodic closing of its front contact *b* will cause the transfer of the energy stored in capacitor 16 into the resistor-capacitor unit 17. The transfer circuit loop is traced from the positive terminal of capacitor 16 through its associated resistor and front contact *b* of relay WTR to resistor-capacitor 17, returning over terminal N and contacts *b* of switch lock WL to the negative terminal of capacitor 16, with the polarity of the charge on capacitor 17 being that designated by the markings shown in FIG. 2. If back contact *b* of relay ETR and front contact *b* of relay WTR are simultaneously closed, transfer of energy may also occur from capacitor 15 directly into capacitor 17, the transfer circuit being similar to that just described. During the off period of the coded energy received from track section WT, the closing of back contact *b* of relay WTR causes the energy stored in capacitor 17 to be transferred over this contact *b* through a discharge circuit including the winding of relay WLA. By proper selection of the values of capacitors 15, 16 and 17, sufficient energy may be transferred to cause relay WLA to pick up, closing its front contacts. The diode 18 connected across the winding of relay WLA provides sufficient delay to the release of this relay to bridge the periodic interruptions in the coded energy supplied to the relay winding. The closing of front contact *b* of relay WLA obviously completes the second circuit for magnet winding WL, energizing this winding to pick up its armature. This releases the lock on the lever of switch lock WL and permits its movement to the full reverse position. Under these conditions, hand throw switch SW is unlocked and may be moved to the reverse position to permit the train to depart from the siding onto the main line. This movement is made with complete protection against any approaching train movements from either direction in the stretch of track shown.

I shall now describe two other operating conditions. During the passage of a through train which does not intend to stop and enter the siding, the overlay track circuit connections and the flow of current to retain relay XTR energized is as previously described in the series connections including front contacts *a* and *b* of relay WNLP. When this train occupies the portion of track between the overlay unit connections, and for a short distance outside these connections, the flow of the overlay track circuit current is from transmitter TTU over wire 9 to rail 1, thence through the shunts provided by the wheels and axles of the train to rail 2 and over wire 12 to receiver unit TRU. The return is over wire 13, front contact *e* of relay NWLP, and wire 14 to the other track terminal of transmitter unit TTU. Thus during the period that the train is shunting the track between the overlay circuit connections, the reactor L and capacitor C combination is not in the actual path of the current flow. Nevertheless, relay XTR remains energized so that the presence of the train is not detected by this relay and thus no interruption occurs in the operation of any of the regular track circuits for the signal system. Particularly, there is no interruption in the supply of cab signal energy to the rails at the cut section.

When a train approaching the location of switch SW, for example, from the left, wishes to use the switch to enter the siding, the train is halted so that at least a portion of the train occupies the track zone between the connections to the rails for the overlay track circuit equipment. Having been so instructed, a member of the train crew unlocks and opens the door of the switch lock case. At the same time, he will move the lever handle from its normal to the indicating position B. With the door of the case open so that contacts *a* of switch lock WL are open to interrupt the circuit, relay NWLP is deenergized and releases. In a manner previously described, this changes the connections for the overlay track circuit apparatus from a series connection with the rails to a normal parallel connection across the rails of track section WT. However, since the train is occupying the track between these rail connections, the overlay track circuit is shunted and receiver unit TRU receives no energy from the associated transmitter unit TTU. Relay XTR is therefore deenergized and releases. The closing of back contact *b* of relay XTR completes the circuit for energizing the magnet winding of switch lock WL, the circuit previously having been prepared by the closing of contacts *b* of switch lock WL, when the door of the case was opened, and lever contact *c* when the lever handle was operated to its B position. With magnet winding WL energized, its armature is raised thereby releasing the lever so that it may move to its full reverse position, thus unlocking switch SW for hand throw movement to its reverse position. Under these conditions, the opening of contacts e of switch lock WL merely interrupt the circuit for relay NWLP at another point. Likewise, the movement of switch SW to its reverse position further interrupts the NWLP circuit at contact WCC. The train may now enter the siding over switch SW in its reverse position. If the entering train is moved so that the portion of section WT between the overlay track circuit rail connections is cleared of any wheel and axle shunt, relay XTR will be reenergized and pick up. However, relay NWLP will not be reenergized until its complete circuit is restored by the return of the switch to its normal position, closing the WCC contact N, and by the restoration of the switch lock apparatus to its normal condition so that lever and armature contacts in the circuit are closed.

It can be seen, therefore, that the overlay track circuit arrangements of my invention provide a system by which the immediate release of an electric switch lock may be obtained but without the danger of interrupting the continuity of cab signals being displayed on through trains not desiring the switch lock release. These arrangements thus retain the advantage provided by the overlay track circuit of requiring no additional insulated joints to obtain the switch lock release circuits but at the same time without creating the disadvantage of interference with the free movement of through trains. This operation can be obtained with either form of overlay track circuits, that is, the single transmitter-receiver unit or with a separate transmitter and receiver. A minimum of apparatus in addition to the overlay track circuit apparatus and the normal switch lock equipment is required in order to provide the circuit arrangements. A positive check is provided in each arrangement that, prior to restoring the normal operation of the regular signal system, all elements of the switch lock apparatus are in their normal or nonactuated position. In other words, any abnormal condition or position of the switch lock apparatus or the associated switch will be detected by the regular signal system and the proper danger signals displayed.

Although I have herein shown and described only two circuit arrangements embodying the features of my invention, it is to be understood that further changes and modifications in these arrangements within the spirit and scope of the following claims are intended as part of the scope of my invention.

Having thus described my invention, what I claim is:
1. In a railroad signal system for a stretch of single track over which trains move in both directions, said system including apparatus for controlling train carried signal apparatus, a control arrangement for switch lock apparatus applied to an intermediate track switch within said stretch, comprising in combination,
   (a) transmitting and receiving means adapted to be connected to the rails in the vicinity of said intermediate switch for detecting independent of said signal system a train occupying a predetermined zone of said stretch,
   (b) auxiliary circuit means connected for cooperating with said transmitting and receiving means and controlled by said switch lock apparatus for activating said transmitting and receiving means to detect train occupancy of said predetermined zone only when preliminary preparations for releasing said switch lock apparatus have been completed,
   (c) unlocking circuit means controlled by said transmitting and receiving means and further responsive to said preliminary preparations of said switch lock apparatus for completing the full release of said switch lock apparatus when said transmitting and receiving means detects a train occupying said predetermined zone.
2. A switch lock control arrangement as claimed in claim 1 in which said transmitting and receiving means comprises an alternating current overlay track circuit having a selected frequency substantially higher than the frequency of said rail energy controlling said train carried signal apparatus, said overlay circuit including a track relay controlled by said transmitting and receiving means for controlling said switch lock apparatus when said track circuit has detected the occupancy of said predetermined zone by a train.
3. A switch lock control arrangement as claimed in claim 2 in which said auxiliary circuit means includes a capacitor having characteristics selected to maintain said overlay track circuit in a non-detecting condition when said switch lock apparatus remains fully locked.
4. A switch lock control arrangement as claimed in claim 1, further comprising,
   circuit means controlled jointly by said transmitting and receiving means and by said switch lock apparatus for withholding from said rails control energy for said train carried signal apparatus when said transmitting and receiving means has responded to a train occupying said predetermined zone and said switch lock apparatus has been released.
5. A switch lock control arrangement as claimed in claim 1, further comprising,
   (a) a relay means controlled by said switch lock apparatus and responsive to said preliminary preparations for establishing a permissive condition for full release of said switch lock apparatus, and wherein:
   (b) said transmitting and receiving means comprise an overlay track circuit of a selected frequency unique in said signal system and including a track relay to provide at times an indication of track occupancy in said predetermined zone,
   (c) said auxiliary circuit means includes a circuit element tuned to pass current of said selected frequency and normally connected for maintaining said overlay track circuit in the same operative condition with and without a train occupying said predetermined zone,
   (d) said relay means having connections to said auxiliary circuit means for activating said overlay track circuit into condition for detecting occupancy of said predetermined zone by a train only when said relay means has established said permissive condition,
   (e) said unlocking circuit means includes a contact of said track relay closed when a train is detected for actuating the full release of said switch lock apparatus.
6. A switch lock control arrangement as claimed in claim 2, further comprising,
   (a) a preparatory relay means controlled by said switch lock apparatus to occupy a first position when said switch lock is in its fully locked condition and a second position when said switch lock is in a preliminary condition for release,
   (b) a capacitor having a value selected to substantially block the flow of rail currents used in said signal system of other than said selected frequency,
   (c) said auxiliary circuit means including said capacitor connected to the rails of said stretch of track for normally holding said overlay track circuit in its non-detecting condition,
   (d) said rail connections of said capacitor controlled by said preparatory relay means so that trains are detected by said overlay track circuit only when said relay means is in its second position.
7. A switch lock control arrangement as claimed in claim 2 further comprising,
   (a) a tuned impedance unit capable of passing current of said selected frequency and blocking other rail currents used in said signal system,
   (b) said auxiliary circuit means normally connecting said transmitting and receiving means and said im- pedance unit in a series circuit with the rails of said predetermined zone, (c) said auxiliary circuit means further controlled by said switch lock apparatus for transferring the connections of said transmitting and receiving means to a parallel connection across said rails excluding said impedance unit when the preliminary preparations of said switch lock apparatus for release are completed.

8. A switch lock control arrangement as claimed in claim 2, further comprising,
(a) an impedance unit tuned for passing current of said selected frequency and substantially blocking other rail currents used in said signal system, and
(b) a preparatory relay controlled by said switch lock apparatus to occupy a first position when said lock is in its fully locked condition and a second position when said lock is in a preliminary condition for release, and wherein:
(c) said auxiliary circuit means is controlled by said preparatory relay for connecting said transmitting and receiving means and said impedance unit in a series circuit with the rails of said predetermined zone over first position contacts of said preparatory relay and only said transmitting and receiving means in a parallel circuit across the rails of said zone over second position contacts of said preparatory relay,
(d) whereby said track relay remains energized by a train shunt when said preparatory relay is in its first position and releases to detect a train shunt when said preparatory relay is in its second position,
(e) said unlocking circuit means includes a released position contact of said track relay for completing the release of said switch lock apparatus.

9. A switch lock control arrangement as claimed in claim 1, wherein,
(a) said transmitting and receiving means includes
(1) separate transmitter and receiver units for establishing an overlay track circuit in said predetermined zone having a selected frequency substantially higher than that used for said train carried signal apparatus, and
(2) a track relay controlled by said receiver unit to its energized position only when energy of said selected frequency is received,
(b) said switch lock apparatus includes a preparatory relay controlled by said apparatus to a first position when a fully locked condition exists and to a second position when said preliminary preparations for releasing the switch lock have been completed.
(c) said auxiliary circuit means includes an impedance unit tuned for passing current of said selected frequency and substantially blocking other rail currents used in said signal system and is controlled by said preparatory relay for connecting
(1) said transmitter, receiver, and impedance units in a series circuit with the rails of said predetermined zone over first position contacts of said preparatory relay,
(2) said transmitter and receiver units in parallel across said rails of said predetermined zone over second position contacts of said preparatory relay, whereby said track relay releases to detect a train occupying said predetermined zone only when said preparatory relay is in its second position,
(d) said unlocking circuit means includes a released position contact of said track relay for completing the release of said switch lock apparatus only when a train is detected by the overlay track circuit apparatus.

10. A switch lock control arrangement as claimed in claim 1, wherein,
(a) said transmitting and receiving means includes a track relay controlled by said means to its energized position only when a complete circuit exists across the rail connections of said transmitting and receiving means,
(b) said switch lock apparatus includes a preparatory relay controlled by said apparatus to a first position when a fully locked condition exists and to a second position when said preliminary preparations for releasing the switch lock have been completed,
(c) said auxiliary circuit means includes a capacitor having a value selected to substantially block the flow of rail currents used in said signal system of other than said selected frequency,
(d) said capacitor being connected across the rails of said predetermined zone over a first position contact of said preparatory relay, whereby said track relay can detect a train shunt within said predetermined zone only when said preparatory relay occupies its second position,
(e) said unlocking circuit means includes an energized position contact of said track relay and another contact controlled by said preparatory relay in its second position for completing the release of said switch lock only when a train shunt in said predetermined zone is detected by said transmitting and receiving means.

11. A switch lock control arrangement as claimed in claim 1, further comprising,
signal circuit means controlled by said transmitting and receiving means and by said switch lock apparatus for indicating the existence of an abnormal condition in said transmitting and receiving means or said switch lock apparatus which will restrict the movement of trains through said stretch.

12. A switch lock control arrangement as claimed in claim 5, further comprising,
signal circuit means controlled by contacts of said overlay track relay for indicating the existence of a fault condition in said overlay track circuit which will prevent the release of said switch lock apparatus.

References Cited
UNITED STATES PATENTS

| | | | |
|---|---|---|---|
| 2,896,068 | 7/1959 | Auer et al. | 246—34 |
| 2,998,514 | 8/1961 | Shields et al. | 246—34 |
| 3,025,393 | 3/1962 | Crain | 246—34 X |

ARTHUR L. LA POINT, *Primary Examiner.*

S. T. KRAWCZEWICZ, *Assistant Examiner.*